(12) United States Patent
Mergen (10) Patent No.: US 8,681,994 B2
(45) Date of Patent: *Mar. 25, 2014

(54) SYSTEMS AND METHODS FOR DOCUMENT CONTROL USING PUBLIC KEY ENCRYPTION

(75) Inventor: John-Francis Mergen, Baltimore, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,349

(22) Filed: Mar. 15, 2011

(65) Prior Publication Data

US 2011/0167266 A1    Jul. 7, 2011

Related U.S. Application Data

(63) Continuation of application No. 11/556,372, filed on Nov. 3, 2006, now Pat. No. 7,916,870.

(51) Int. Cl.
*H04L 9/00*      (2006.01)
*H04L 9/08*      (2006.01)
*H04L 29/06*     (2006.01)
*H04L 9/32*      (2006.01)
*G06F 21/62*     (2013.01)

(52) U.S. Cl.
CPC .... *G06F 21/6209* (2013.01); *G06F 2221/0771* (2013.01); *H04L 63/068* (2013.01); *H04L 29/06748* (2013.01)
USPC ............. 380/278; 380/277; 380/44; 380/259; 380/279; 713/165; 713/171

(58) Field of Classification Search
CPC ................... G06F 21/6209; G06F 2221/0771; H04L 63/068; H04L 29/06748
USPC ............ 713/168, 165, 171; 380/44, 259, 277, 380/278, 279
See application file for complete search history.

(56) References Cited

U.S. PATENT DOCUMENTS

| 6,289,450 B1 | 9/2001 | Pensak et al. |
| 6,363,480 B1 * | 3/2002 | Perlman ........................ 713/164 |
| 6,574,611 B1 | 6/2003 | Matsuyama et al. |

(Continued)

FOREIGN PATENT DOCUMENTS

| CN | 1356636 | 7/2002 |
| CN | 1361530 | 7/2002 |
| CN | 1614688 | 5/2005 |

*Primary Examiner* — Mohammad W Reza (57) ABSTRACT

Systems and methods for document control using public key encryption are provided. An interface program serves as a software interface between user applications used to create and access documents and a data storage system that stores the documents in an encrypted form. When a document is saved for the first time, information corresponding to the destruction of that document is obtained either from a user or in accordance with predefined criteria. The document is encrypted and stored with a pointer to an encryption key on a token/key server. When the document is subsequently accessed, the interface program will read the pointer and attempt to retrieve the key. If the key has expired in accordance with the destruction policy, the document is inaccessible. Otherwise, the document is decrypted using the key. Multiple documents may be saved according to the same destruction policy and even the same key, thereby greatly enhancing the ability to "destroy" documents regardless of their location with minimal process.

14 Claims, 5 Drawing Sheets

(56) References Cited

U.S. PATENT DOCUMENTS

| | | |
|---|---|---|
| 6,892,220 B2 * | 5/2005 | Seol et al. ............. 709/203 |
| 7,099,846 B1 | 8/2006 | Ishibashi et al. |
| 7,203,966 B2 | 4/2007 | Abburi et al. |
| 7,353,209 B1 | 4/2008 | Peinado et al. |
| RE41,186 E * | 3/2010 | Pensak et al. ............. 713/171 |
| 2002/0078361 A1 * | 6/2002 | Giroux et al. ............. 713/183 |
| 2003/0001757 A1 | 1/2003 | Kondo et al. |
| 2003/0014447 A1 * | 1/2003 | White ............. 707/530 |
| 2006/0229911 A1 | 10/2006 | Gropper et al. |
| 2006/0277229 A1 * | 12/2006 | Yoshida et al. ............. 707/203 |

* cited by examiner

| ENCRYPTION KEY | POLICY NAME | DESTRUCTION DATE | POLICY OWNER |
|---|---|---|---|
| 329oqoieruoi818889181 | Billing Records - 2001 | 01/01/2008 | CFO |
| 4894u53($*(#$&8lkijlsvw | Merger Diligence | 04/1/2007 | GC |
| . . . | Billing Records - 1999 | 01/01/2004 (passed) | CFO |
| | . . . | . . . | . . . |

SYSTEMS AND METHODS FOR DOCUMENT CONTROL USING PUBLIC KEY ENCRYPTION

CROSS-REFERENCE TO RELATED APPLICATIONS

This application claims priority from U.S. patent application Ser. No. 11/556,372, now issued as U.S. Pat. No. 7,916,870, filed on Nov. 3, 2006 and entitled "Systems And Methods For Document Control Using Public Key Encryption."

BACKGROUND INFORMATION

As a result of the now nearly universal migration in the business world from paper-based documents to electronic documents, document management has become a significant issue for large, mid-size and even small companies, firms, and organizations.

Old, obsolete, and redundant documents consume large amounts of server space in networked computer systems. As a result, these entities may be required to constantly increase server space or resort to frequent backup and purge operations which may be expensive and impractical to implement. Furthermore, with the now common practice of emailing documents between computers, a single document may spawn multiple different documents or versions stored on one or more different computer systems. Backup and recovery systems may exacerbate this problem because these systems merely take a snap shot of existing documents—documents are often subsequently updated or changed and these new versions are also saved without reference or index to earlier versions. Also, when a user copies a document off of a network server onto a local computer system such as a laptop or other off-network computer system, network controlled file maintenance systems may be unable to perform routine deletions or other file maintenance operations. These factors may combine to increase the complexity of document management and retention for information technology (IT) administrators.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF PREFERRED EMBODIMENTS

The following description is intended to convey a thorough understanding of the embodiments described by providing a number of specific embodiments and details involving public key encryption-based document retention and management. It should be appreciated, however, that the present disclosure is not limited to these specific embodiments and details, which are exemplary only. It is further understood that one possessing ordinary skill in the art, in light of known systems and methods, would appreciate the use of the inventions for its intended purposes and benefits in any number of alternative embodiments, depending upon specific design and other needs.

As used herein, the term "documents" will be used to refer to an electronic file. User applications are programs that can be used to create documents. For example, a document can be created in user applications such as text editors, word processing applications, spreadsheet applications, presentation applications, portable document applications, databases, etc.

Figure 1:
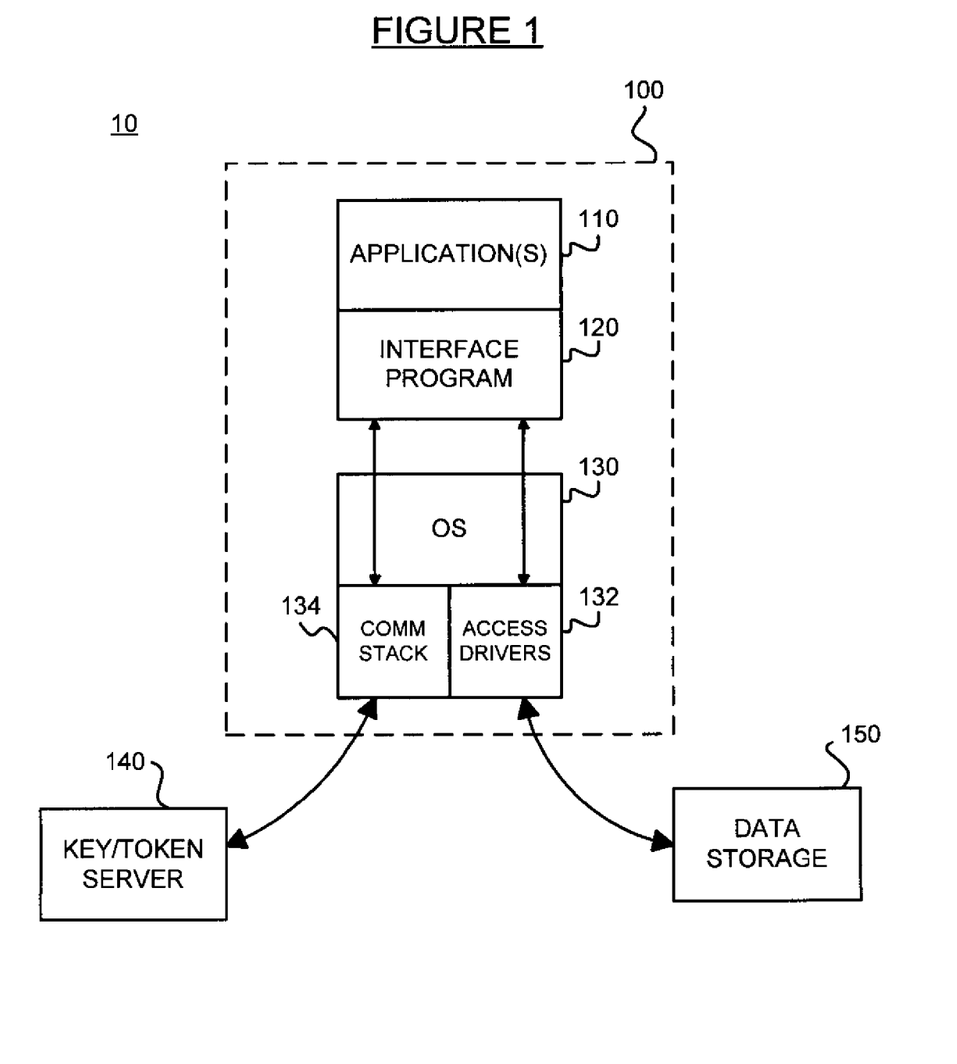
FIG. 1 is a schematic diagram of an exemplary public key encryption-based system for document retention according to at least one embodiment of the disclosure.

Referring now to FIG. 1, a schematic diagram of an exemplary public key encryption-based system 10 for document retention according to at least one embodiment of the disclosure is depicted. The exemplary system 10 of FIG. 1 may comprise a computer system 100 including one or more user applications 110, which in various embodiments may be used to create, access and modify electronic documents, an interface program that serves as an interface between the one or more user applications 110 and the remaining system components when an electronically document is to be saved or accessed. The system 10 may also comprise an operating system (OS) 130 including access drivers 132 and a communication stack 134. The system 10 may further comprise a key/token server 140 and one or more data storage devices 150. It should be appreciated that the one or more data storage devices 150 may comprise a network-based storage device, a local storage device or a file management system.

In an exemplary embodiment, when a user attempts to save a document from a user application 110, the interface program 120, herein referred in some cases as a "shim," may be automatically invoked. The interface program 120 may then obtain destruction information regarding a destruction policy for the current document and, using the operating system's communication stack 134 may obtain an encryption key to encrypt the document. Using the operating system's access drivers 132, the interface program 120 may save the document on the data storage device 150 as an encrypted document with a pointer in the document in header to a key on the key/token server 140. The key length may be any suitable length. The various embodiments of the system are not dependent upon a particular length. If the key is held in a Pretty Good Privacy (PGP) environment the key can be as long as 4096 bits. When a user application 110 subsequently tries to gain access to the encrypted document from the data storage device 150, the interface program 120 may be automatically invoked and, after reading the appropriate pointer information from the document header, may request the key from the key/token server 140. If the key is still active, that is, it has not passed the expiration date specified in the destruction policy, the key may be returned to the shim so that the document can be decrypted and viewed with by the requesting application. Otherwise, if the key for that document has expired, the interface program 120 may send a message to the requesting application stating that the document is no longer available and/or that it is been destroyed.

Figure 2:
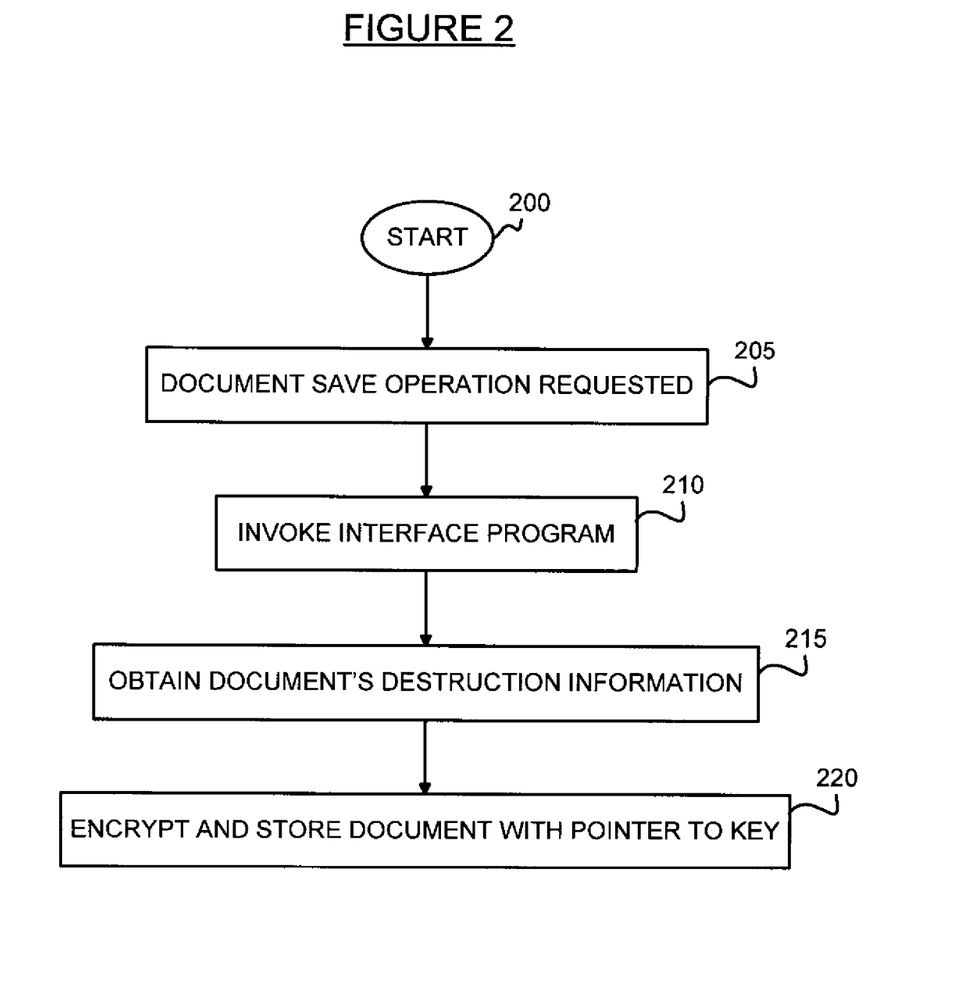
FIG. 2 is a flow chart of an exemplary method of saving a document in a public key encryption-based system for document retention according to at least one embodiment of the disclosure.

FIG. 2 is a flow chart of an exemplary method of saving a document in a public key encryption-based system for document retention according to at least one embodiment of the disclosure. Operation of the method begins in block 200. In block 205, a document save operation is requested. In various embodiments, this may be initiated by a user submitting a save command to a user application via a user interface. In other embodiments, this may be initiated automatically, such as by an auto save operation performed by the user application, and/or whenever a new document is created.

In block 210, in response to the received save request, the user interface program may be automatically invoked. In an exemplary embodiment, the user interface program, or shim as it is sometimes referred to herein, may comprise a relatively small (compared to the size of a user application) software program that is specific to the operating system of the user's computer system 100 upon which the requesting application is running, thereby enabling it to call operating system components such as the communication stack 134 and access drivers 132. Therefore, the shim may be running on a server computer and/or it may be running locally on each user's computer in a network or other distributed computing environment. In this manner, document control may be maintained regardless of whether a document is stored locally or on a centralized server. Also, in an exemplary embodiment, the shim may detect the application's request so that it may not be necessary to modify the user application itself to utilize the various systems and methods described in the current disclosure.

In block 215, the interface program 120 may obtain the document's destruction information, such as by obtaining one or more rules relating to the destruction of the current document. The destruction information may be obtained via user entry, that is, a user may be prompted to enter one or more pieces of information relating to the destruction of the document, such as a destruction policy. Also, the user may be prompted to select one or more entries from a pre-populated list of destruction information and/or destruction policies. Alternatively, or in addition, the destruction information may be obtained from a previously specified destruction policy and/or a default policy. For example, the interface program may access a default destruction policy, such as deleting the document after five years. Alternatively, there may be a policy specified for documents associated with a particular business unit, person, team, etc. The destruction policy may apply to documents of a certain type, class, time period, or other criteria. Also, the destruction information may be obtained via an electronic request from the interface program 120 to the key server 140. As discussed herein, "destruction" of a document is affected by destroying the key for that document. Once the key is destroyed, it becomes impossible to open/read any documents created with that key. Thus, regardless of where the document is located after the key expires, it is rendered unreadable.

In block 220, the document may be stored in a designated storage device based on the destruction information. In an exemplary embodiment, the document may be encrypted and any unencrypted versions may be concurrently deleted. Also, the document may preferably include a pointer to a key on the key server 140 that can be used to decrypt the document upon subsequent access so long as the key is available. The exemplary method of FIG. 2 may be performed whenever a document is saved for the first time, either locally, or on a network-based server.

Also, it should be appreciated that the technique described in FIG. 2 may be applied to already existing documents that have not been previously subject to the technique. For example, if a save operation is requested, the interface program may be invoked to determine if the current document includes a pointer to an encryption key. If so, the document will be saved in encrypted form as described above in the context of block 220. Otherwise, the steps beginning in block 215 may be performed to "migrate" the document to the document retention system according to the various embodiments of the invention.

Figure 3:
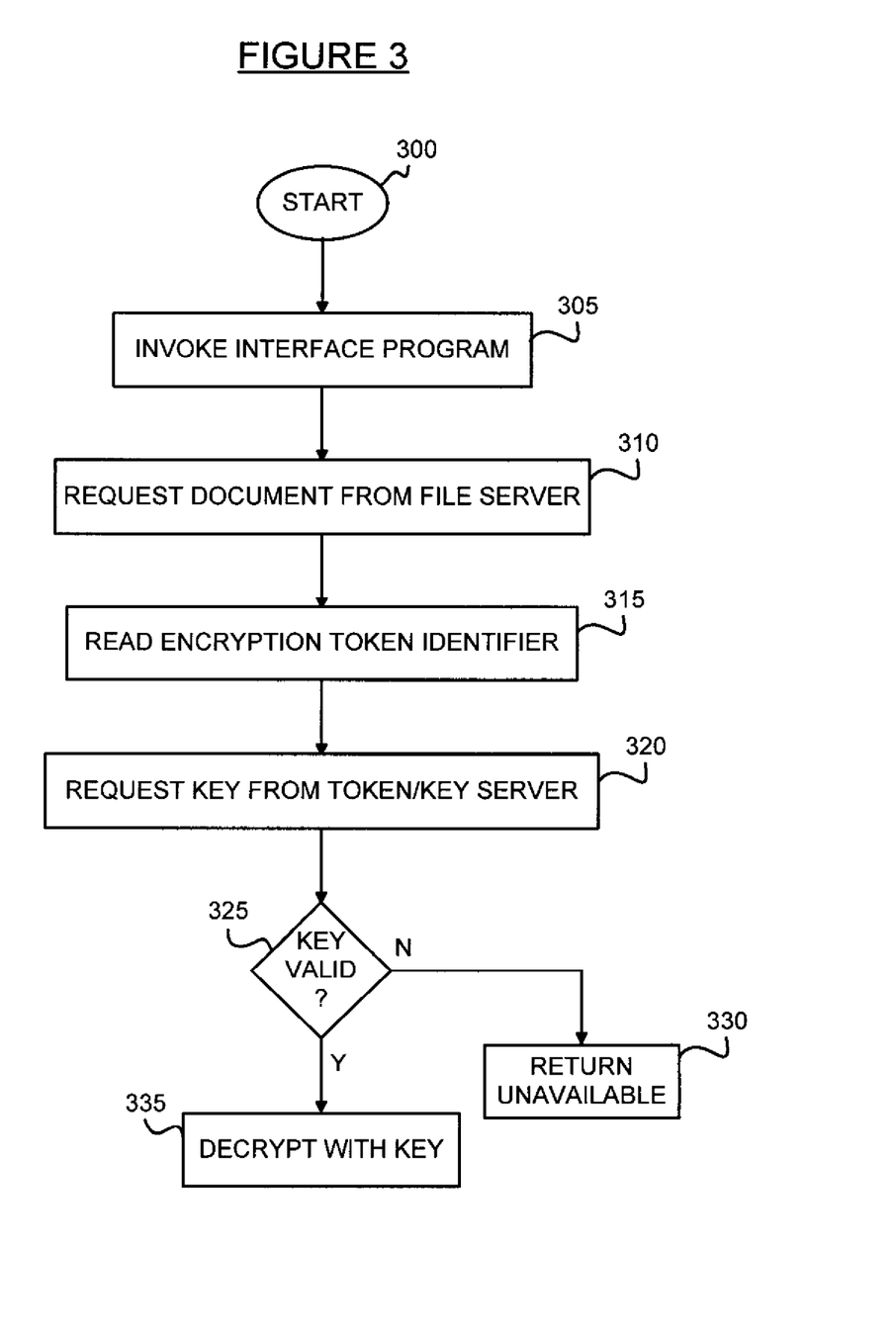
FIG. 3 is a flow chart of an exemplary method of accessing an encrypted document stored in a data storage device using a public key encryption-based system for document retention according to at least one embodiment of the disclosure.

Referring now to FIG. 3, a flow chart of an exemplary method of accessing an encrypted document stored in a data server using a public key encryption-based system for document retention according to at least one embodiment of the disclosure is depicted. Operation of the method begins in step 300. In step 305, the interface program may be invoked. In various embodiments, step 305 is preceded by a user request via an interface of a user application to access a document stored in the storage device 150. In an exemplary embodiment, the interface program 120 may be invoked automatically upon receipt of such a document access request.

In block 310 the interface program 305 may request the document from the data storage device, such as data storage device 150 in FIG. 1. In various embodiments, this may comprise requesting the document using the access drivers 132 of the operating system 130, as shown in FIG. 1. As discussed above, the data storage device 150 may be located in the same computer system that the requesting application is running on, e.g. computer system 100 in FIG. 1. Also, the data storage device 150 may be remote, such as in when access to a document stored on a network server is being requested.

In block 315, after the requested document has been retrieved, the interface program 120 may read the encryption key identifier, which may preferably be located in a document header of the encrypted document. In various embodiments, the encryption key identifier may point to a file, index, or other addressable data structure on a key server, such as key server 140 in FIG. 1. It should be appreciated that for documents that have not been stored in accordance with the various systems and methods disclosed herein, that is, documents that are not encrypted, the remaining blocks of the method of FIG. 4 may be optional because the retrieved document may be supplied directly to the requesting user application.

In block 320, the interface program 120 may request the encryption key identified in the document from the key server 140. The key server 140 may be located at a different physical location with respect to the interface program 120 so long as it may be accessed remotely, that is, over a communication network. In step 325, a determination may be made as to whether or not the key is valid, which, in turn may indicate whether or not the current document has been destroyed and is therefore no longer accessible. According to at last one embodiment, this determination may be based on the existence of absence of the encryption key for the current document. If in block 325, no key is returned from the key server, the interface program may return a "document no longer available" message to the requesting application. In at least one embodiment, a message and/or pop-up screen may be presented to a user indicating that the requested document is no longer available or has been destroyed. Otherwise, if in block 325 a key is returned by the key server, operation may proceed to block 335 where the interface program may decrypt the document using the supplied key and present the decrypted document to the user via an interface of the requesting application.

Figure 4:
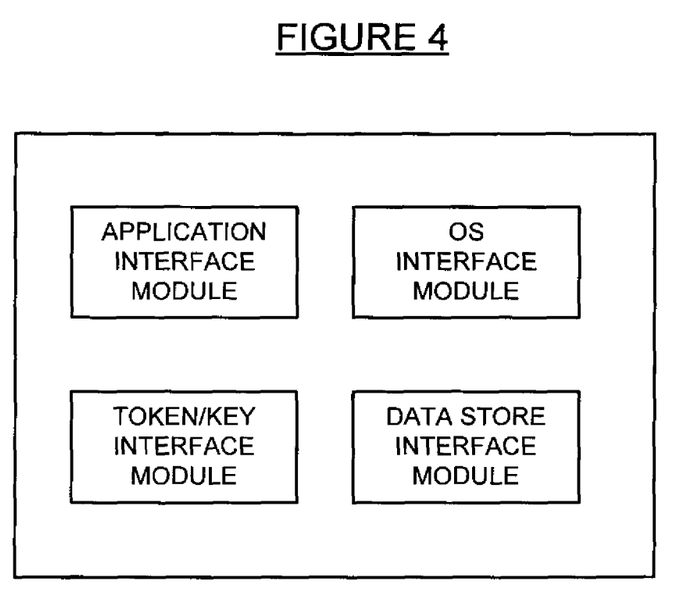
FIG. 4 is a block diagram illustrating exemplary components of a public key encryption-based document retention interface program for interfacing between client applications, a token/key encryption server, and a data server according to at least one embodiment of the disclosure.

Referring now to FIG. 4, a block diagram illustrating exemplary components of a public key encryption-based document retention interface program 120 for interfacing between client applications, a token/key encryption server, and a data server according to at least one embodiment of the invention is depicted. As discussed above, in various embodiments, the program 120 may be installed on a user computer system, such as the computer system 100 in FIG. 1. Also, the program 120 may be stored on one or more centralized network computer systems. The program 120 may comprise various modules which may provide functionality that enables one or more user applications to save encrypted documents, to access encrypted documents and to facilitate organized, centralized document retention and destruction. In the example of FIG. 4 there is an application interface module 122, an operating system (OS) interface module 124, a token/key server interface module 126, and a data store interface module 128. It should be appreciated that although in some exemplary embodiments, each module may comprise components of a software-based program, each module may also be configured as separate software applications executing on computer hardware, one or more application specific integrated circuits (ASICs), a combination of hardware and software, or other suitable configuration. Moreover, one or modules may be combined or broken into multiple additional modules. Also, additional and/or different modules than those shown in FIG. 4 may be utilized.

In various embodiments, the application interface module 122 may comprise one or more application program interfaces (APIs) for interfacing with one or more user applications. As discussed above, the application interface module 122 may be invoked automatically whenever a compatible user application requests a document and/or attempts to save a document. Also, the application interface module 122 may receive document save and document access requests from one or more compatible user applications.

The operating system (OS) interface module 124 may permit the interface program 120 to utilize the OS's existing communication stack and access drivers to access one or more data storage devices and a key/token server. In various embodiments, the OS interface module 124 may be specific to a particular operating system, such as for example, WINDOWS, LINUX, MAC OS, or other suitable operating system. In other embodiments, the OS interface module 124 may be usable with a plurality of different operating systems—that is, it may comprise program code for performing redundant communication functions with a plurality of different operating systems.

The token/key interface module 126 may interact with a local and/or remote encryption key server, such as key server 140 in FIG. 1. For example, during a document storage operation for a newly created document, the interface program 120 may utilize the token/key interface module 126 to access the key server 140 to obtain encryption key information for the document to be saved. As discussed above, the key server may provide information identifying the destruction policy for the current document, the user may be prompted to supply this information, and/or a set of default policy information may be used. Also, other document profile fields specified by the user may be used to determine the appropriate destruction policy.

As another example, in a document access operation, the token/key interface module 126 may read key identification information from a requested document, such as in a header portion of a retrieved encrypted document, and communicate this information to the key server 140 to determine whether the key is still valid. The token/key interface module 126 may receive a key to be used in decrypting the requested document, if the key is still valid. Otherwise, the token/key interface module 126 may receive an indication from the key server that the key is unavailable. If no key is returned, the token/key interface module 126 may assume that no key is available and thus indicate to the user application that the requested document is no longer available.

It should be appreciated that the particular modules illustrated in FIG. 4 are exemplary only and should not be construed as either necessary or exhaustive. In various embodiments, it may be desirable to use more, less or even different modules than those illustrated in FIG. 4.

Figure 5:
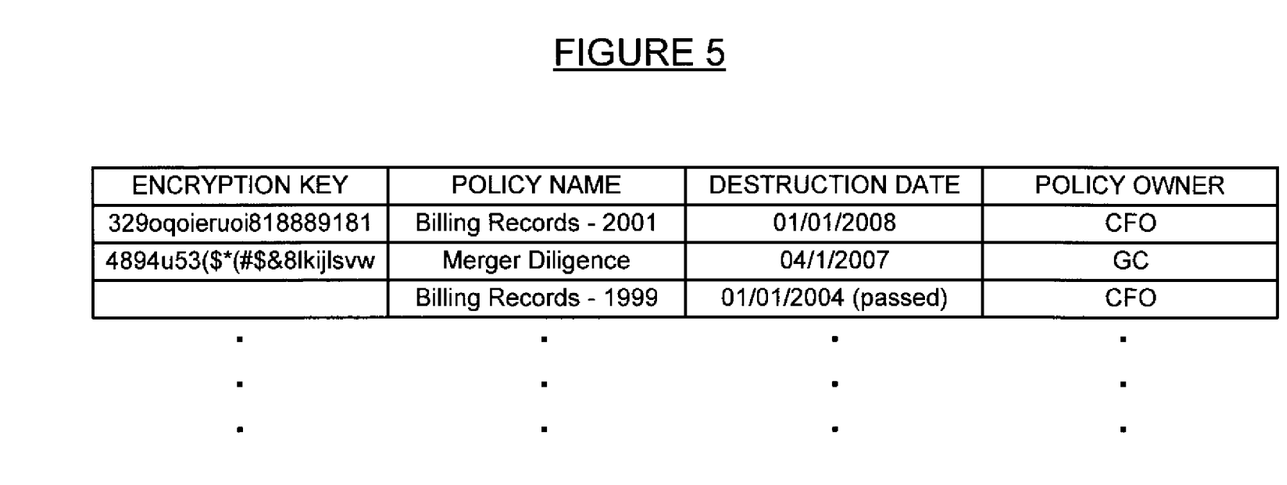
FIG. 5 is an exemplary token/key encryption table illustrating document destruction policy information according to at least one embodiment of the disclosure.

Referring now to FIG. 5, an exemplary token/key encryption table 400 illustrating document destruction policy information according to at least one embodiment of the invention is depicted. It should be appreciated that although various encryption keys/policies are stored in a single table/file 400 in the example of FIG. 5, in other embodiments, one or more may be stored in separate data structures. In various embodiments, one or more policies may be defined through a separate user interface through which a user specifies the encryption key, policy name, destruction date, and/or the policy owner—i.e., the organizational unit, person, and/or responsible entity. In the example of FIG. 5, there are two active destruction policies—billing records—2001 and merger diligence, owned by the chief financial officer (CFO) and general counsel (GC) respectively. There is also an inactive policy titled "billing records—1999" who's key is missing because the destruction date of Jan. 1, 2004 has passed. Thus, if a document is requested that includes a pointer to the billing records—1999 policy, the key server will not return an encryption key. Therefore, the regardless of where the document may be stored, it will no longer be accessible.

A feature of the various embodiments of the disclosure is that by specifying the encryption key at the time of document creation, all subsequent versions will be effectively destroyed, that is, rendered inaccessible in accordance with a specified destruction policy. Another feature is that the destruction of multiple different documents, that is, not just different versions of the same documents, but distinct documents related to the same policy owner, may be controlled through a single destruction policy. For example, if one or more persons working on a particular project in a company/firm/organization, etc. are working on series of documents related to the same project, a single retention policy may be specified for documents related to that project. Whenever new documents are created that relate to the project, the user may select the corresponding policy or this policy may be selected automatically based on other document identification fields supplied by the user.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than a restrictive sense.

The invention claimed is:

1. A system comprising:
an encryption key server that is configured to:
provide an encryption key for a requesting application when a document is initially saved by the requesting application;
store a decryption key and destruction information associated with the document and a subsequent version of the document, wherein the destruction information is further associated with one or more distinct documents and subsequent versions of each of the one or more distinct documents;

provide the decryption key to the requesting application in response to at least one of the document and the subsequent version of the document being subsequently opened; and destroy the decryption key in accordance with one or more key destruction rules indicated in the destruction information, wherein at least one of the one or more key destruction rules specify an expiration date of the decryption key for the document and the subsequent version of the document.

2. The system according to claim 1, wherein the one or more key destruction rules are received from user input.

3. The system according to claim 1, wherein the one or more key destruction rules are default rules of the encryption key server.

4. The system according to claim 1, wherein the encryption server comprises a software-based interface to an encryption requesting software application that encrypts and decrypts documents for one or more user applications running on a computing device.

5. The system according to claim 4, wherein, upon a subsequent request to the encryption server for a decryption key, the encryption server is configured to provide the decryption key if it is still valid.

6. The system according to claim 4, wherein, upon a subsequent request to the encryption server for a decryption key, the encryption server is configured to provide an indication to the encryption requesting software application that the decryption key is unavailable.

7. The system of claim 1, wherein the document includes a header comprising an encryption key identifier that points to the location of the encryption key on the encryption key server.

8. The system of claim 2, wherein the user is prompted to select the one or more destruction rules from a pre-populated list of destruction policies.

9. The system of claim 1, wherein the destruction information comprises one of a plurality of destruction policies, wherein each of the plurality of destruction policies is associated with one or more distinct documents based on at least one of an author associated with the document, a business unit associated with the document, a team associated with the document, a document type, a document class, or a document time period.

10. A method comprising:
receiving a request to apply a document control policy to a document wherein the document control policy is associated with a decryption key and destruction information associated with the document and a subsequent version of the document, wherein the destruction information is further associated with one or more distinct documents and subsequent versions of each of the one or more distinct documents;

sending the document control policy information associated with the document and the subsequent version of the document to the key server;

receiving an encryption key in response to a request for the encryption key;

encrypting the document and the subsequent version of the document with the encryption key;

storing the document and the subsequent version of the document in an encrypted format with information for obtaining a decryption key; and destroying the decryption key in accordance with one or more key destruction rules, wherein at least one of the one or more key destruction rules specify an expiration date of the decryption key for the document and the subsequent version of the document.

11. The method according to claim 10, further comprising
receiving a request to access an encrypted document;
sending a request for the decryption key to the key server in response to the request;
receiving the decryption key; and
decrypting the document with the decryption key.

12. A non-transitory computer readable media comprising code to perform the acts of the method of claim 10.

13. A method comprising:
receiving a request, from a client, for an encryption key to encrypt at least one of a document and a subsequent version of the document, wherein the document and subsequent version of the document are associated with destruction information, wherein the destruction information is further associated with one or more distinct documents and subsequent versions of the one or more distinct documents;

sending the encryption key to the client;

receiving a request for a decryption key from the client upon a subsequent attempt to open at least one of the document and the subsequent version of the document;

sending the decryption key to the client; and destroying the decryption key in accordance with one or more key destruction rules, wherein at least one of the one or more key destruction rules specify an expiration date of the decryption key for the document and the subsequent version of the document.

14. A non-transitory computer readable media comprising code to perform the acts of the method of claim 13.

* * * * *